US012731330B2

(12) United States Patent
Kumarareddy et al.

(10) Patent No.: US 12,731,330 B2
(45) Date of Patent: Sep. 8, 2026

(54) SYSTEM AND METHOD TO CAPTURE VIRTUAL REALITY PROCEEDINGS

(71) Applicant: Mitel Networks Corporation, Kanata (CA)

(72) Inventors: Veena Kumarareddy, Bangalore (IN); Tejas Kanduri Aswathanarayana Murthy, Bangalore (IN); Logendra Naidoo, Ottawa (CA)

(73) Assignee: Mitel Networks Corporation, Kanata (CA)

( * ) Notice: Subject to any disclaimer, the term of this patent is extended or adjusted under 35 U.S.C. 154(b) by 317 days.

(21) Appl. No.: 18/541,532

(22) Filed: Dec. 15, 2023

(65) Prior Publication Data

US 2025/0200874 A1 Jun. 19, 2025

(51) Int. Cl.
*G06T 17/00* (2006.01)
*G06F 21/62* (2013.01)
*G06T 13/40* (2011.01)

(52) U.S. Cl.
CPC .......... *G06T 17/00* (2013.01); *G06F 21/6218* (2013.01); *G06T 13/40* (2013.01); *G06F 2221/2141* (2013.01)

(58) Field of Classification Search
CPC ..... G06T 17/00; G06T 13/40; G06F 21/6218; G06F 2221/2141; G06Q 10/1093; H04N 7/157
See application file for complete search history.

(56) References Cited

U.S. PATENT DOCUMENTS

2009/0077161 A1 3/2009 Hamilton, II et al.
2021/0056860 A1 2/2021 Fahrendorf et al.
2022/0392175 A1 12/2022 Freiwirth

FOREIGN PATENT DOCUMENTS

WO 2023141273 A1 7/2023

OTHER PUBLICATIONS

Anchor.ai, “5 Automated Meeting Notes Tools for Hands-Free Documentation”, retrieved from Internet on Jan. 26, 2024 at https://anchor.ai/blog/automated-meeting-notes/.
Hypercontext, “Automated Minutes that'll save you hours”, retrieved from Internet on Jan. 26, 2024 at https://hypercontext/features/meeting-minutes.
Otter.ai, “Get the most from meetings with AI”, retrieved from the Internet on Jan. 26, 2024 at https://otter.ai/business.

(Continued)

*Primary Examiner* — Xiao M Wu
*Assistant Examiner* — Latrell Anthony Creary

(57) ABSTRACT

A computer system and method captures digitized elements of all or a portion of a virtual reality (VR) proceeding generated by a VR server and analyzes the digitized elements of the VR proceeding to determine a core subject matter. The system comprises (1) a VR capture processor in communication with the VR server, wherein the VR capture processor is configured to capture some or all of the digitized elements of a VR proceeding generated by the VR server, (2) one or more databases in communication with the VR capture processor that are configured to store the captured digitized elements of the VR proceeding, and (3) a VR proceeding analyzer configured to analyze the captured digitized elements of the VR proceeding and to determine a core subject of all or a portion of the VR proceeding, preferably by analyzing one or more of the principles of rhetoric.

20 Claims, 5 Drawing Sheets

(56) References Cited

OTHER PUBLICATIONS

Jamie, "Summarize Any Meeting.", retrieved from the Internet on Jan. 26, 2024 at https://www.meetjamie.ai.

Pocket-Lint, "How to get Zoom to automatically take meeting notes with this simple trick", retrieved from the Interent on Jan. 26, 2024 at https://pocket-lint.com/apps/news/.

Tactiq, "ChatGPT for MS Teams: How to Generate Automatic Meeting Notes", retrieved from the Internet on Jan. 26, 2024 at https://tactiq.io/learn.

Shiota Tsukasa et al., The Discussion Corpus toward Argumentation Quality Assessment in Multi-Party Conversation, Abstract and pp. 281-283., Sep. 1, 2020, 9th International Congress on Advanced Applied Informatics (IIAI-AAI), IEEE.

SYSTEM AND METHOD TO CAPTURE VIRTUAL REALITY PROCEEDINGS

FIELD

This disclosure relates to capturing digitized elements of virtual reality (VR) proceedings, particularly in a VR proceeding business context, and using the captured digitized elements to determine not only the logic aspect of a proceeding but also the ethereal, emotional, and manner of presentation of a VR proceeding.

BACKGROUND

In traditional online videoconferences and audio meetings, minute-taking functions primarily focus on capturing spoken content and metrics (e.g., who spoke, when they spoke, how often they spoke, etc.). Such systems and methods rely on, for example, audio transcription services, natural language processor (NLP) analysis, manual note-taking, or simplified software tools to document who spoke, when, how often, for how long, and about what topics. While these systems and methods provide a basic record of the meeting's verbal content, they miss non-verbal cues about participant engagement levels, interest, and the effectiveness of a VR proceeding. As a result, while they provide a functional summary of a VR proceeding, they lack depth in capturing dynamics, intricacies, and effectiveness.

Methods of capturing detailed minutes in traditional, physical office space proceedings are insufficient for a VR proceeding because the technology used (such as cameras and movement detection) miss a multitude of non-verbal cues. As an example, NVIDIA's VCR implementation focuses primarily on the technical aspects of a VR proceeding, such as a playback for developers, timecoding, and tracking motion/button presses. This may be sufficient for game developers and gamers.

Current VR capture systems provide an infrastructure to record and play back a VR proceeding, but do not capture the essence of the VR proceeding in terms of the rhetoric principles of (1) perhaps the entirety of the logos, which includes the logical portion of the presentation content, (2) the ethos, which includes credibility and making participants receptive to the VR proceeding topics, (3) the pathos, which includes emotional or sympathetic undertones, or (4) the kairos, which includes the timing and manner of presentation content. NVIDIA (and similar technology) captures the "what" and "when" of VR proceedings, while the system and method of this disclosure also capture the "how" and "why," thus capturing and allowing the analysis of a virtual experience according to the principles of rhetoric of ethos, pathos, logos, and kairos. Capturing and understanding these aspects of a VR proceeding is more suitable to VR providers desiring to generate a comprehensive understanding and summary of VR proceedings, particularly for business purposes.

The system and method of this disclosure thus captures digitized elements of a VR proceeding, such as avatar choice, avatar gestures, the VR environment selected, and others, to capture some or all of the rhetoric principles of a VR proceeding. This provides a holistic account of a VR proceeding, aids in virtual engagement monitoring, post-VR proceeding analysis to improve future VR proceedings, and compliance with business standards.

BRIEF DESCRIPTION OF THE DRAWINGS

The subject matter of the present disclosure is particularly pointed out and distinctly claimed in this specification. A more complete understanding of the present disclosure, however, may be obtained by referring to the detailed description and claims when considered in connection with the drawing figures, wherein:

Figure 1:
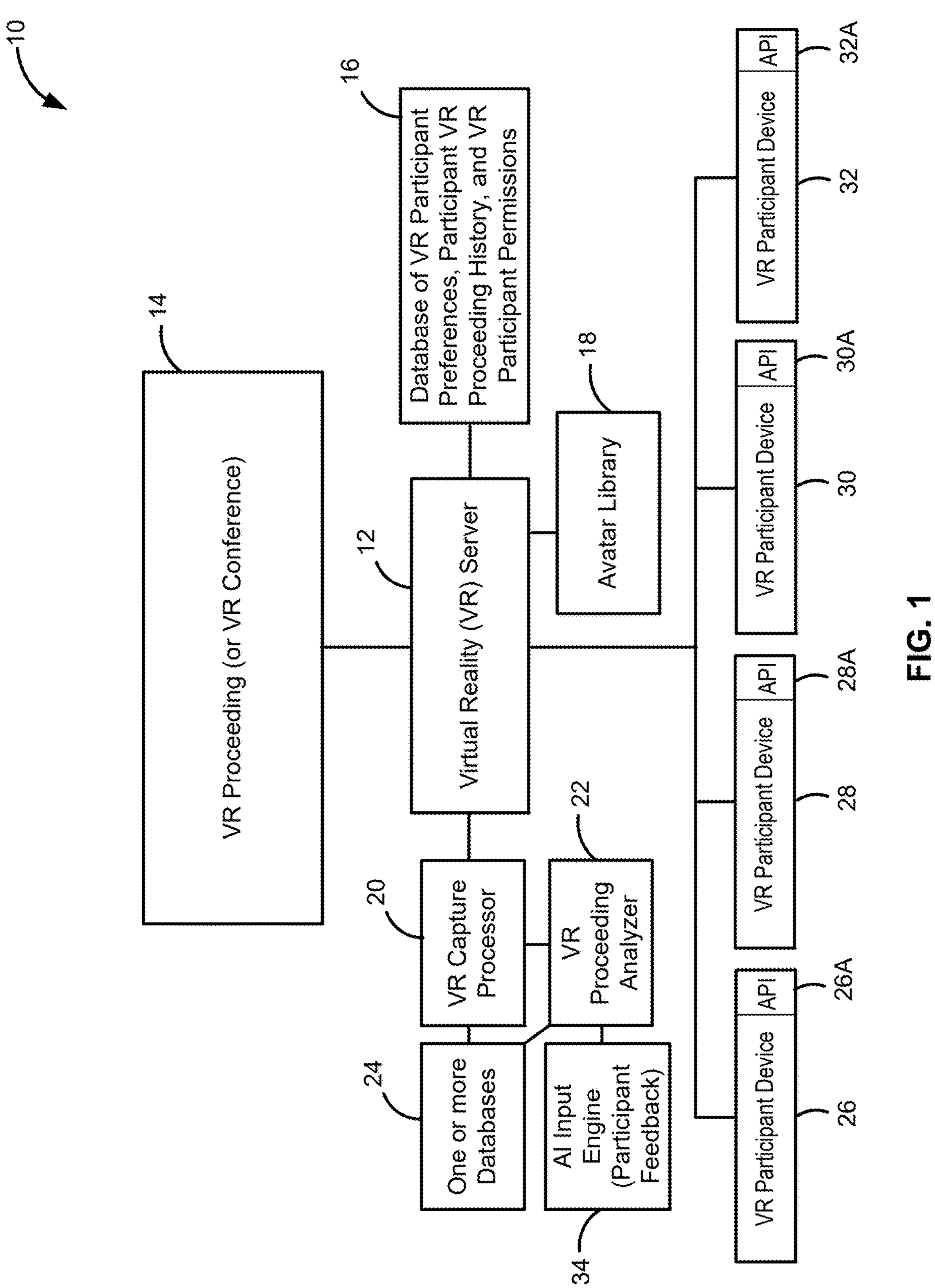
FIG. 1 shows a computer system in accordance with aspects of this disclosure.

It will be appreciated that structures, devices, and method steps in the figures are illustrated for simplicity and clarity and have not necessarily been drawn to scale. For example, the dimensions of some of the structures in the figures may be exaggerated relative to other structures to help to improve understanding of illustrated embodiments of the present disclosure.

DETAILED DESCRIPTION

The description of exemplary embodiments of the present invention provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

As set forth in more detail below, exemplary embodiments of the disclosure relate to electronic communication systems, and corresponding methods performed by such systems, that can, for example, capture and analyze digital elements of a VR proceeding in a professional or business perspective. In addition to transcribing just spoken content for information relating to the logical appeal, called logos, of a VR proceeding, the system and method of this disclosure records, and logs digitized elements such as avatar dynamics, gestures, spatial interactions with virtual widgets, gestural input by a person or avatar during presentations, the environment of VR proceedings, virtual interactions in the VR proceeding, and concurrent VR activities undertaken by VR proceeding participants. These are used to capture some or all of the rhetorical principles of ethos, pathos, logos, and kairos of VR proceedings, particularly professional VR proceedings. The captured digitized elements can be analysed to determine effective rhetoric techniques and be used to assist in improving VR proceeding techniques.

As used herein, the terms application, processor, sub-processor, module, analyzer, engine, and the like can refer to computer program instructions, encoded on computer storage medium for execution by, or to control the operation of, data processing apparatus.

Alternatively, or additionally, the program instructions can be encoded on an artificially generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially generated propagated signal. The computer storage medium is non-transitory and can also be, or be included in, one or more separate physical components or media (e.g., solid-state memory that forms part of a device, disks, or other storage devices).

As used herein, "engine" refers to a data-processing apparatus, such as a processor, configured to execute computer program instructions, encoded on computer storage medium, wherein the instructions control the operation of the engine. Alternatively, or additionally, the program instructions can be encoded on an artificially generated propagated signal, e.g., a machine-generated electrical, optical, or electromagnetic signal, which is generated to encode information for transmission to suitable receiver apparatus for execution by a data processing apparatus.

As used herein, "database" refers to any suitable database for storing information, electronic files or code to be utilized to practice embodiments of this disclosure. As used herein, "server" refers to any suitable server, computer or computing device for performing functions utilized to practice embodiments of this disclosure.

Turning now to the figures, wherein the purpose is to describe embodiments of this disclosure and not to limit the scope of the claims, FIG. 1 shows a VR computer system 10 that is configured to capture digitized elements of all or a portion of a VR proceeding 14, such as a VR business conference or customer-customer service interaction. The computer system comprises a VR server 12 that works in conjunction with, but may be separate from, the VR capture devices or software.

As shown, system 10 includes a VR server 12 that is configured to produce a VR proceeding 14. VR proceeding 14 may be a work-related conference, a social conference, a customer interaction with a customer service agent, or any type of VR proceeding. VR server 12 is in communication with a database 22 that includes one or more of information related to each VR participant's (i.e., the person or bots who will participate in VR proceeding 14) (1) respective preferences, (2) prior VR proceeding history, and (3) permissions or security clearance. Each of these individual types of data may instead be in separate databases rather than in a single database 22, or a plurality of types of data may be stored in one database and other data may be stored in a different database.

The VR server 12 is also in communication with one or more VR participant devices and four VR participant devices 24, 26, 28, and 30 are shown. Each VR participant device is associated with a unique VR participant. VR server 12 operates to make VR proceeding 14 accessible and be displayed on one or more of participant devices 24, 26, 28, and 30 so the unique participant associated with each of the VR participant devices can participate in the VR proceeding 14. To participate in a VR proceeding, a VR participant may use any suitable VR device, such as VR goggles, VR glasses, a VR helmet, or the screen of the VR participant device may make the VR proceeding 14 appear three dimensional. Each VR participant device has a respective input device and application program interface (API) 26A, 28A, 30A, and 32A that permits each participant to communicate with VR server 12 and navigate and communicate in VR proceeding 14. Alternatively, some or all of the VR participant's navigation and communication in VR proceeding 14 may be accomplished by use of a VR device or camera that tracks the VR participant's movements and/or gestures.

An avatar library 18 is in communication with the VR server 12 and stores any number of avatars for selection and use by VR participants. Alternatively, a VR participant need not select an avatar for use in a VR proceeding 14. If a VR participant utilizes an avatar, the avatar is selected from avatar library 18, preferably by using the API on the participant's VR participant device to access avatar library 18 through VR server 12. The selected avatar is positioned in the VR proceeding 14 to represent the VR participant. Alternatively, the avatar may automatically be selected based on the VR participant's preferences or VR proceeding history, which are stored in database 16. The VR participant has the ability in his/her participant device to make his/her avatar move, gesture, interact with other avatars, interact with VR widgets, and potentially change avatar facial expressions during VR proceeding 14.

A VR capture processor 20 is in communication with VR server 12 and is configured to monitor VR proceeding 14 and capture some or all of the digitized elements of VR proceeding 14. Such digitized elements could include one or more of avatar selection, avatar movement, gestures, avatar interaction with other avatars, avatar interaction with VR widgets, avatar facial expressions, avatar entrance to or leaving VR conference 14, the selected VR environment, changes in the VR environment, voices and voice selection, spoken words, presented textual information, voice intonation, avatar inactivity, and standard logical capture information, such as who is speaking, the content of the speech and/or presented text, how long the person speaking, how many times the person speaks, and what the person says.

The captured digitized elements are also tagged with timestamps and/or a type of topic sequencing to help determine kairos. The timestamp can be placed by any suitable device such as the VR server 12, the VR capture processor 20 (or VR server 52, or VR sub-processor 32, which are discussed below), or the VR proceeding analyzer 22 (discussed below). For example, if a VR participant's comment caused a dramatic changes in the course of the dialog or it created strong reactions of the other avatars (participants), highlighting this in the recording may represent a kairotic moment where the timing of the comment was noted by the system. Additionally, a time stamp and the digitized elements of the VR proceeding 14 can be useful in determining kairos, because determining participant activity and at different times and/or with different backgrounds may indicate the importance of the time and background for a given topic presented to a given type of participant, such as one or more of age (younger or older), sex, education, training, organizational responsibility, geographic location, types of social media interaction, and others.

One or more databases 24 are configured to store the captured digitized elements. A VR proceeding analyzer 22 is in communication with the VR capture processor and, in this embodiment, is in communication with the one or more databases 24. The VR proceeding analyzer 22 is configured to review and analyze the captures digitized elements, either as they are captured by the VR capture processor 20 and/or after they are stored in the one or more databases 24. The VR proceeding analyzer 22 can determine a core subject of the VR proceeding 14 or any portion(s) thereof, and can generate a rhetoric score for all, or a portion, or multiple portions, of the VR proceeding 14 by analyzing the captured, digitized elements for one or more of ethos, pathos, logos, and kairos.

Any core subject may be given a rhetoric score or weighting, such as from 1-5 with 1 being the lowest and 5 being the highest for each rhetoric principle, or for a combination of rhetoric principles, in which case scores for a plurality of rhetorical principles can be combined to form an aggregate score. If determining an aggregate score, each rhetoric principle used to form the aggregate score may be weighted according to its perceived importance for the core subject. As an example, if the core subject is highly technical, the measured logos and ethos may be given more weight than pathos and Kairos. If the core subject is highly emotional, such as donating to charity or emphasizes the beauty of vacation destinations, pathos may be weighted higher than logos.

The system 10 or 50 (described below) or method 100 (described below) may include an artificial intelligence (AI) engine 34 as part of or in communication with VR proceeding analyzer 22. AI engine 34 can learn and teach VR proceeding analyzer 22 to better determine rhetorical scores based on feedback by VR proceeding participants about the effectiveness (by rating) of all or a portion(s) of a VR proceeding 14 with respect to one or more of the principles of rhetoric. The VR proceeding analyzer 22 can then compare the feedback to each of the digitized elements of VR proceeding 14 and match the various digitized elements with the participants' ratings. In this manner the VR proceeding analyzer 22 can learn what digitized elements are likely to lead to a particular rhetorical principle score and over time based on participant feedback rate or develop scores for a VR proceeding 14 without participant's feedback, although participant feedback could still be utilized.

Using the score(s) or rating(s) by VR proceeding analyzer 22 an organization or presenter can modify future VR proceedings to be more effective.

Figure 2:
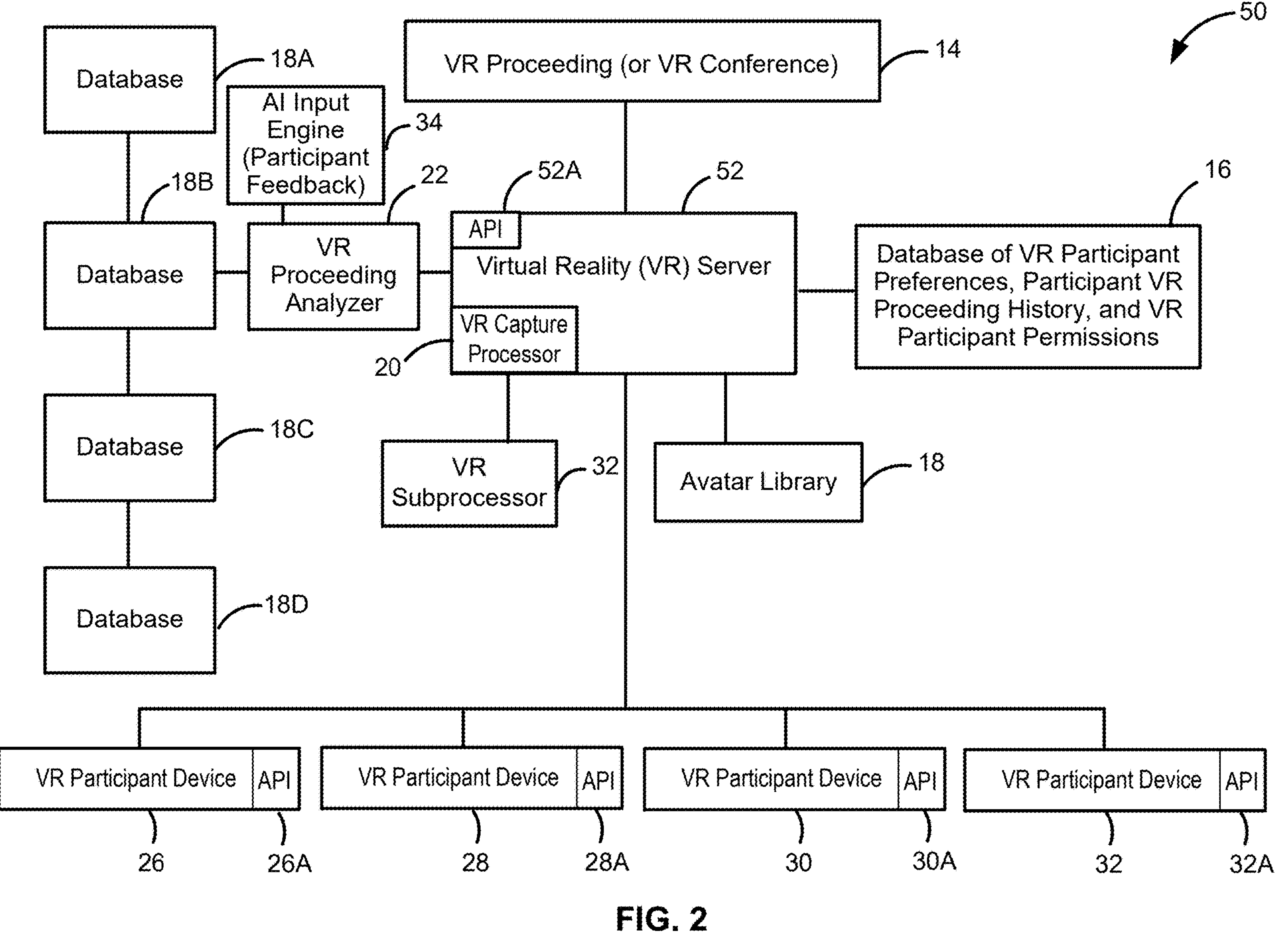
FIG. 2 shows an alternate computer system in accordance with aspects of this disclosure.

FIG. 2 shows an alternate system 50 in accordance with this disclosure. A VR server 52 is the same as previously described VR server 12 except that VR capture processor 20 is part of VR server 52. VR server 52 causes VR proceeding 14 to proceed and to be made available to the one or more participant devices 26, 28, 30, and 32 as described above. Database 16 is the same as, and functions in the same manner as database 16 of FIG. 1. Avatar library 18 is the same as, and functions in the same manner, as avatar library 18 of FIG. 1.

VR capture processor 20 is the same as (except for being part of VR server 52) and functions in the same manner as, VR capture processor 20 of FIG. 1. VR proceeding analyzer 22 is the same as, and functions in the same manner, as VR proceeding analyzer 22. System 50 includes a plurality of databases and in this embodiment there are four databases 18A, 18B, 18C, and 18D, although there could be any number of databases. In system 50 each database 18A, 18B, 18C, and 18D stores a different type of digitized element captured by VR capture processor 26. One or more database 18A, 18B, 18C, and 18D could also include the VR proceeding analyzer's 22 analysis of the core subject for all or part, or multiple parts, of VR proceeding 14.

System 50 further includes a VR sub-processor 32 in communication with the VR capture processor 20. VR sub-processor 32 is configured to apply a continuous event logging subprocess that captures digitized elements such as (a) an environment of the VR proceeding, such as background and sound, and transmits each digitized element of the environment of the VR proceeding 14 to the one or more databases 18, or to one or more of the plurality of database 18A-18D so the digitized elements can be stored, and (b) a change in the VR proceeding 14 environment and transmits each change and the time of the change in the VR proceeding 14 environment to the one or more databases 18 or to one or more of the plurality of databases 18A-18D so the change and time can be stored.

VR sub-processor 32 compares the VR proceeding 14 environment and the change in the VR proceeding 14 environment for adherence to any corporate guidelines with respect to VR proceedings. VR sub-processor 32 blocks any VR proceeding 14 environment, including an introduction of new environmental tools or widgets by a VR proceeding participant, that is not in adherence with the corporate guidelines.

Figure 3:
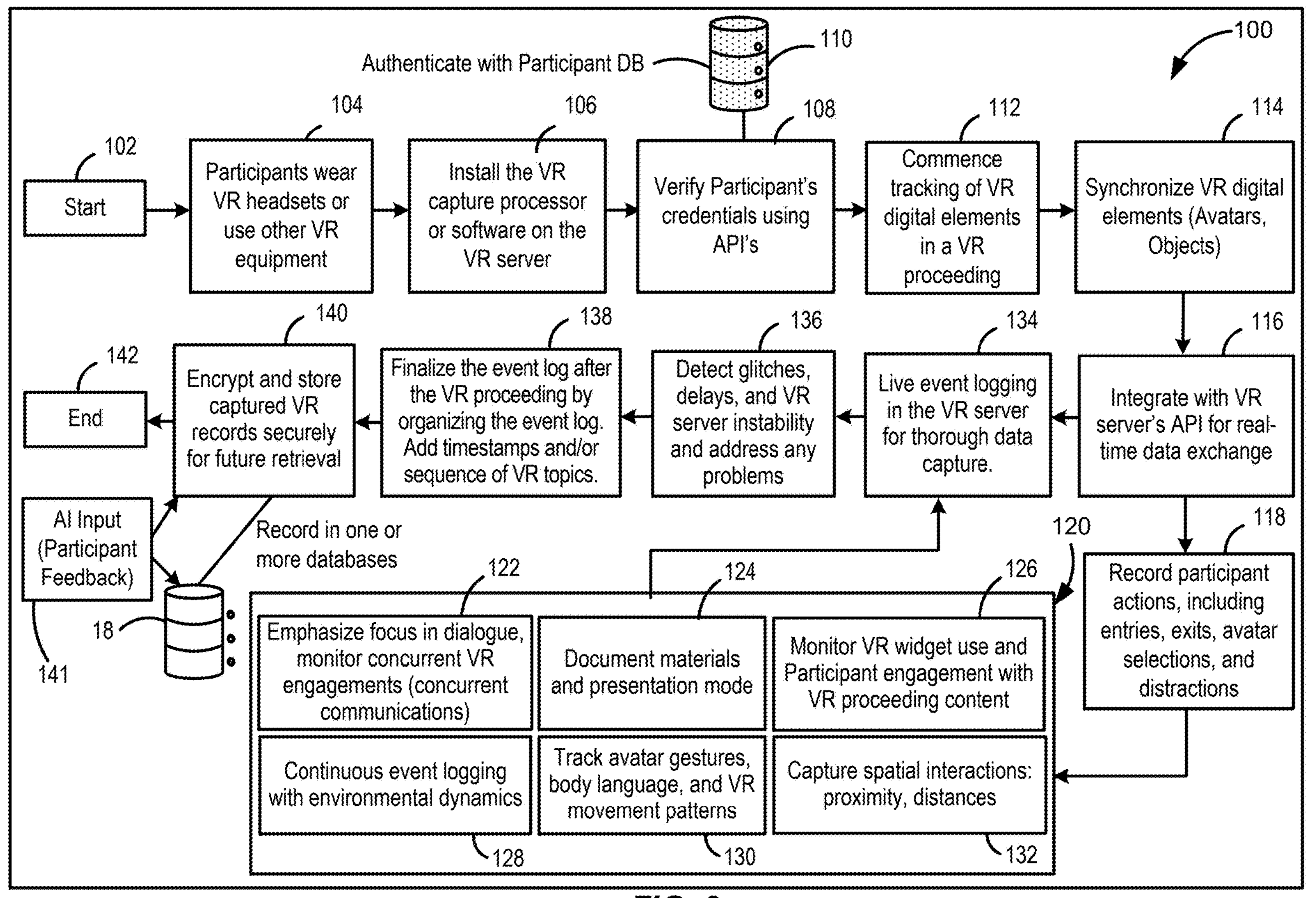
FIG. 3 shows a computer method in accordance with aspects of this disclosure.

FIG. 3 shows a method 400 according to this disclosure. The method starts at step 102. At step 104 participants in a VR proceeding 14 can wear VR headsets, googles, glasses, or use other VR equipment to make the VR proceeding 14 environment appear in 3D. At step 106, if not already installed, the VR capture processor 20 or VR capture software can be installed on the VR server 12 or otherwise be placed in communication with the VR server 12 (e.g., the VR capture processor 20 may be a device separate from the VR server 12). At steps 108 and 110 a participant's credentials and/or permissions are verified/authenticated by VR server 12, which may be done utilizing the participant's database (which can be database 16) and an application programming interface (API) 12A of VR server 12 or 52A of VR server 52. At step 112 the VR capture processor 20 commences the tracking of VR digital elements in VR proceeding 14. At step 114 the VR digital elements are synchronized and at step 116 the VR capture processor 20 integrates with the VR server 12 or 52, such as through the respective APIs 12A, 52A for real time data exchange between the VR server 12 or 52 and the VR capture processor 20. At step 118 participant actions in the VR proceeding 14, such as entries, exits, avatar selections, and distractions (such as the use of a cell phone) are recorded.

Step 120 includes a number of sub-steps 122-132 regarding the monitoring of the digital elements by VR capture processor 20, wherein steps 122-132 can occur simultaneously, some can occur separately, or all can occur tentatively and at different times. At step 122 the VR capture processor 20 records an emphasized focus in dialogue and monitors concurrent VR engagements (i.e., concurrent communications). At step 124 the VR capture processor documents (i.e., records) materials used in the VR proceeding 14 and the presentation mode of the VR proceeding 14. At step 126 the VR capture processor 20 monitors VR widget use and participant engagement with the VR proceeding 14 content. At step 128 the VR capture sub-processor 32 performs continuous event logging with environmental dynamics. At step 130 the VR capture processor 20 tracks avatar gestures, avatar body language, and avatar VR movement patterns. At step 132 the VR capture processor 20 captures (or records spatial interactions, such as proximity and distance.

At step 134 there is live event logging in the VR server 12 for thorough data capture. At step 136 the system 10 or 50 detects glitches and/or delays in the VR proceeding 14, and VR server 12 or 52 instability, and system 10 or 50 addresses any technical problems.

At step 138 system 10 or 50 finalizes an event log of the recorded digital elements after the VR proceeding 14 has concluded by organizing the recorded digital elements. At step 140 the recorded digital elements may be encrypted. They are stored for future retrieval and use in one or more databases 18 or in plurality of databases 18A-18D. At step 141 AI input, which may be in the form of participant feedback, may be provided to the digitized elements at any suitable step, such as at step 140 or when the captured VR records are stored in the one or more databases 18. As previously mentioned, the AI input provides information for the VR proceeding analyzer 22 to learn how participants react according to the principles of rhetoric to the captured digitized elements for each core subject. The method stops at step 142.

Figure 4:
FIG. 4 shows a sample output of a virtual reality capture of a VR proceeding (or metaverse) creative collaboration meeting.
Figure 5:
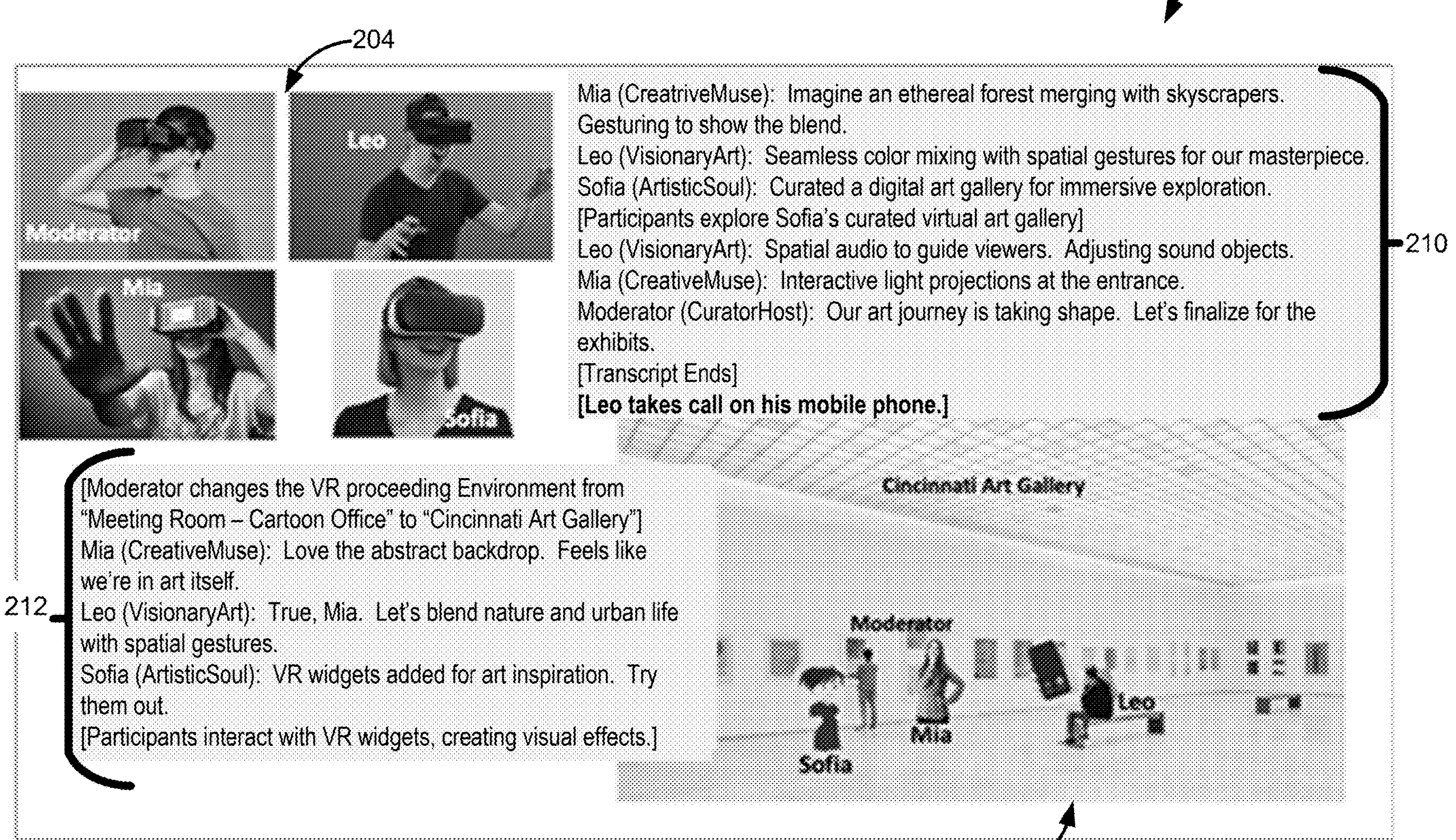
FIG. 5 is a continuation of the sample output of the virtual reality capture of FIG. 4.

FIGS. 4-5 show a sample output 200 of a VR capture of a metaverse creative collaboration meeting 202, which has four participants 204: a moderator, Leo, Mia, and Sofia. Part 206 of the VR capture includes the meeting date, the virtual environment type, and the names of the meeting participants. Part 208 of the VR capture includes the time when the transcript (i.e., the recording by the VR capture processor) begins, a default VR proceeding environment, which in this example is set by the moderator, and an introduction by the moderator.

In FIG. 5, part 210 of the VR capture shows speech, images, environments and avatar movement that is captured, and an end to the transcript (or record) when Leo takes a phone call. Part 212 includes the VR proceeding environment, speaking, VR widgets, and avatars interacting with VR widgets to create visual effects. Part 214 depicts the participants as avatars in a VR proceeding in which the environment is the Cincinnati Art Museum.

As professional interactions migrate to the metaverse, the proposed system takes a methodical approach to capturing many or all of the intricacies of VR proceeding. By capturing both the major and subtle elements of a VR experience, a comprehensive record of our proceeding results.

The description of embodiments provided herein is merely exemplary and is intended for purposes of illustration only; the following description is not intended to limit the scope of the claims. Moreover, recitation of multiple embodiments having stated features is not intended to exclude other embodiments having additional or fewer features or other embodiments incorporating different combinations of the stated features. The methods and systems according to this disclosure and claims can operate in a premise, cloud-based, or hybrid environment.

The features of the various embodiments may be stand alone or combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

What is claimed is:

1. A computer system to capture digitized elements of all or a portion of a virtual reality (VR) proceeding generated by a VR server and to analyze the digitized elements to determine a core subject matter, the system comprising:

a VR capture processor in communication with the VR server, wherein the VR capture processor is configured to capture some or all of the digitized elements of a VR proceeding generated by the VR server, wherein there are different types of digitized elements comprising a plurality of (a) VR participant related activities, including (i) VR participant entries into and exits from the VR proceedings, (ii) VR participant avatar choices and alterations, (iii) VR participant public and private chat messages during the VR proceedings, and (iv) VR participant digressions comprising one or more of inactivity in the VR proceeding, the VR participant using a phone, or the participant typing messages unrelated to the VR proceeding, (b) movement and interactions, including (i) avatar movement and gestures, (ii) movement by a VR participant in the VR proceedings, and (iii) VR environmental interactions, including a distance between avatars and/or participants within the VR proceeding, and avatar or VR participant proximity to objects within the VR proceeding;

one or more databases in communication with the VR capture processor and configured to store the captured digitized elements of the VR proceeding; and a VR proceeding analyzer configured to analyze the captured digitized elements of the VR proceeding and to (a) determine a core subject of all or a portion of the VR proceeding, and (b) assign a rhetoric score to the all or portion of the VR proceeding.

2. The computer system of claim 1 that further includes a database of VR participant preferences, profile, VR proceeding history, and permissions, wherein the database is in communication with the VR capture processor or the VR server, and (a) the VR capture processor is further configured to capture and store in the one or more databases the VR participant preferences, profile, VR proceeding history, and permissions for each VR participant, and (b) the VR server is configured to use an application programming interface (API) of the VR server to identify and authenticate each VR participant based on the VR participant's permissions before the participant can participate in the VR proceeding.

3. The computer system of claim 1, wherein the VR capture processor is installed on the VR server prior to commencing the VR proceedings.

4. The computer system of claim 1, wherein the VR capture processor stores each type of digitized element in a separate one of the one or more databases.

5. The computer system of claim 1, wherein the different types of digitized elements further comprise at least one of (c) VR proceeding widgets, (d) participant interactions with the VR proceeding widgets, and (e) presentations and content of the VR proceeding, including one or both of (i) the information in materials presented, and (ii) a mode of presentation of the materials presented, such as virtual screen, holographic, or other.

6. The computer system of claim 1 that further comprises a VR sub-processor configured to apply a continuous event logging subprocess that captures digitized elements of (a) an environment of the VR proceeding, such as background and sound, and transmits each digitized element of the environment of the VR proceeding to the one or more databases so the digitized elements can be stored, and (b) a change in the VR proceeding environment and transmits each change and the time of the change in the VR proceeding environment to the one or more databases so the change and time can be stored.

7. The computer system of claim 6, wherein the VR sub-processor compares the VR proceeding environment and the change in the VR proceeding environment for adherence to corporate guidelines for VR proceedings and block any VR proceeding environment, including an introduction of new environmental tools or widgets by a VR proceeding participant, that is not in adherence with the corporate guidelines.

8. The computer system of claim 1, wherein the VR proceeding analyser determines the core subject by weighing a plurality of the following digitized elements of the VR proceeding: (a) emphasis in dialogue, tone or volume of speech, or both, (b) communications between VR participants or between the host and one or more VR participants, (c) presentations and content of the VR proceeding, including one or both of (i) the information in materials presented, and (ii) a mode of presentation of the materials presented, such as virtual screen, holographic, or other, (d) VR widget use by VR participants, (e) engagement by VR participants with the VR proceeding content, including (i) VR participant entries into and exits from the VR proceeding, (ii) VR participant public and private chat messages during the VR proceedings, and (iii) VR participant digressions, such as inactivity in the VR proceeding, the VR participant using a phone, or the participant typing messages unrelated to the VR proceeding, (f) a VR proceeding environment, (g) avatar selection, modifications, and avatar gestures during the VR proceeding, (h) VR participant body language and participant VR movement patterns, and (i) spatial interactions, such as proximity and distances.

9. The computer system of claim 8, wherein the VR proceeding analyser does not consider any of aspects (f)-(i) if they are deemed to be incompatible with aspects (a)-(e).

10. The computer system of claim 8, wherein the VR proceeding analyser is in communication with the one or more databases and is further configured to store the core subject.

11. A computerized method of capturing digitized elements of all or a portion of a VR proceeding generated by a VR server and to analyze the digitized elements to determine a core subject, wherein the method comprises the steps of:

using a VR capture processor in communication with the VR server, capturing digitized elements of the VR proceeding generated by the VR server, wherein there are different types of digitized elements comprising a plurality of (a) VR participant related activities, including (i) VR participant entries into and exits from the VR proceedings, (ii) VR participant avatar choices and alterations, (iii) VR participant public and private chat messages during the VR proceedings, and (iv) VR participant digressions comprising one or more of inactivity in the VR proceeding, the VR participant using a phone, or the participant typing messages unrelated to the VR proceeding, (b) movement and interactions, including (i) avatar movement and gestures, (ii) movement by a VR participant in the VR proceedings, and (iii) VR environmental interactions, including a distance between avatars and/or participants within the VR proceeding, and avatar or VR participant proximity to objects within the VR proceeding;

storing the captured digitized elements of the VR proceeding in one or more databases; and using a VR proceeding analyzer, analyzing the captured digitized elements of all or a portion of the VR proceeding and determining a core subject of all or a portion of the VR proceeding.

12. The computerized method of claim 11 that further includes the step of the VR capture processor capturing and analysing one or both of (a) participant focusing levels during the VR proceeding, and (b) participants engaging in distractions during the VR proceeding.

13. The computerized method of claim 11 that further includes the step of the VR capture processor detecting and capturing technical aspects of the VR proceeding, including glitches, lags, or VR server instabilities, and/or technical difficulties with avatars and to implement corrective action.

14. The computerized method of claim 11 that further includes the step of, upon completion of the VR proceedings, compiling the VR proceedings by the VR capture processor (a) creating an event log post-meeting, and (b) storing the captured digitized elements and the event log post-meeting in the one or more databases.

15. The computerized method of claim 11, wherein the step of storing the captured digitized elements includes (a) encrypting the digitized elements, and (b) storing the digitized elements in the one or more databases so that they can be accessed by authorized personnel.

16. The computerized method of claim 11 that further includes the step of the VR server verifying a participant's permissions using an API before the participant can participate in the VR proceeding.

17. A computer system for capturing digitized elements of all or a portion of a VR proceeding generated by a VR server and to analyze the digitized elements to determine a core subject, wherein the computer system comprises:

a tangible, non-transitory memory configured to communicate with a VR capture processor that is in communication with the VR server, wherein the tangible, non-transitory memory comprises instructions stored thereon, and in response to execution by the VR capture processor, causes the VR capture processor to:

capture digitized elements of the VR proceeding generated by the VR server, wherein there are different types of digitized elements comprising a plurality of (a) VR participant related activities, including (i) VR participant entries into and exits from the VR proceedings, (ii) VR participant avatar choices and alterations, (iii) VR participant public and private chat messages during the VR proceedings, and (iv) VR participant digressions comprising one or more of inactivity in the VR proceeding, the VR participant using a phone, or the participant typing messages unrelated to the VR proceeding, (b) movement and interactions, including (i) avatar movement and gestures, (ii) movement by a VR participant in the VR proceedings, and (iii) VR environmental interactions, including a distance between avatars and/or participants within the VR proceeding, and avatar or VR participant proximity to objects within the VR proceeding;

store the captured digitized elements of the VR proceedings in one or more databases, wherein the digitized elements are encrypted when they are stored;

using a VR proceedings analyzer, analyzing the captured digitized elements of the VR proceeding and determining a core subject of all or a portion of the VR proceeding and storing the core subject matter in the one or more databases; and permitting authorized persons to access the one or more databases, wherein the VR server accesses a permissions database to retrieve a permission rating for a person to determine if the person is authorized.

18. The computer system of claim 17, wherein the VR capture processor is further configured to detect and capture glitches, delays, and VR server instability and to implement corrective action, wherein the corrective action is one or more of (a) the VR capture processor altering the functioning of the VR server to eliminate one or more VR elements, and (b) the VR capture processor disabling the ability of participants to select one or more VR element options, and (c) sending a message to an operator of the computer system.

19. The computer system of claim 17 that includes the step of the VR capture processor recording VR participant actions, including entries, exits, and avatar selections.

20. The computer system of claim 17 that further includes a security server in communication with the VR server, wherein the security server is configured to detect security content of the VR proceeding that indicates restrictions on the content and that directs the VR server to block the content from being provided to all or some of the VR participants, while allowing the digitized elements of the content to be captured by the VR capture processor.

* * * * *